Figure 1:
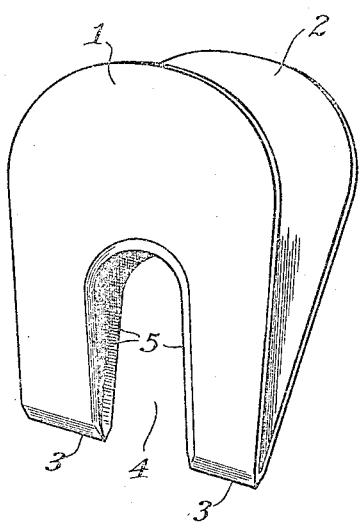

M. A. CLARK.
FRUIT HALVING INSTRUMENT.
APPLICATION FILED NOV. 22, 1917.

1,256,439. Patented Feb. 12, 1918.

INVENTOR:
Mabel A. Clark
by Davis & Simms
her attorneys

UNITED STATES PATENT OFFICE.

MABEL A. CLARK, OF ROCHESTER, NEW YORK.

FRUIT-HALVING INSTRUMENT.

1,256,439.  Specification of Letters Patent.  Patented Feb. 12, 1918.

Application filed November 22, 1917. Serial No. 203,451.

*To all whom it may concern:*

Be it known that I, MABEL A. CLARK, a citizen of the United States, and resident of Rochester, in the county of Monroe and State of New York, have invented certain new and useful Improvements in Fruit-Halving Instruments, of which the following is a specification.

The present invention relates to fruit halving instruments, and more particularly to instruments adapted to halve fruit provided with a single pit or stone, such, for instance, as peaches, apricots and the like, an object of this invention being to provide an instrument which will, in addition to cutting the fruit about the pit, act to spread the two halves of the fruit in order to break the connecting portions not cut by the instrument.

To this and other ends, the invention consists in certain parts and combinations of parts all of which will be hereinafter described, the novel features being pointed out in the appended claims.

In the drawings:—

Figure 2:
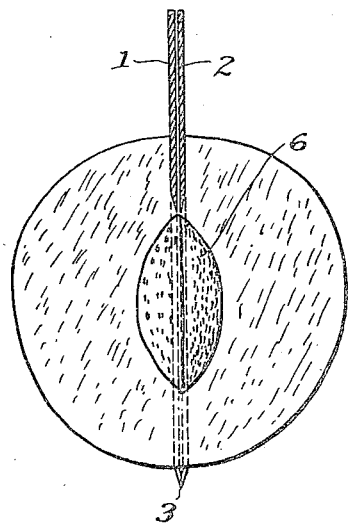
Figure 3:
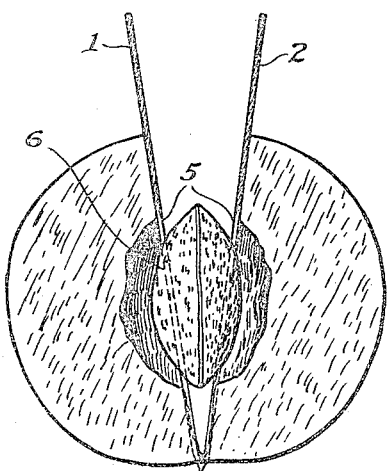

Figure 1 is a perspective view of an instrument constructed in accordance with the present invention;

Fig. 2 is a sectional view of the instrument showing the two blades arranged as when they are held together by the hand of the user, and introduced into a fruit to cut the latter about the pit, the fruit being shown in section; and Fig. 3 is a view similar to Fig. 2, showing the two blades in the positions they assume when released by the hand of the user in order that the blades may separate automatically to spread the two halves of the fruit apart, thus permitting the pit, if the fruit be of the freestone variety, to be released from the two halves.

According to the illustrated embodiment of the invention, 1 and 2 indicate two blades connected together for relative movement. In this instance, these two blades are formed from a single piece of spring sheet material, bent upon itself as at 3, this bend permitting the relative movement between the blades. Each blade is further provided with a slot 4, the slots in the two blades registering and intersecting the bend which connects the blades. This bend is beveled on opposite sides, so that common cutting edges are provided on opposite sides of the registering slots 4. The edges of the slots 4 are also beveled at 5 to provide cutting edges.

In the use of the invention, the free portions of the blades are pressed together so that the two blades may be simultaneously introduced into the fruit in the manner illustrated in Fig. 2, for the purpose of severing the fruit on three sides of the pit 6. After this is accomplished, the free ends of the blades are released and they spread apart under the spring action as illustrated in Fig. 3, thus separating the two halves of the fruit and breaking the connecting portions between the two halves on the fourth side of the pit, as well as causing the pit to drop out of the fruit, if the fruit be of the freestone variety.

While the present embodiment employs two blades, it is apparent that the invention is not limited to the use of two blades, but that one blade may be employed with any other suitable means associated therewith which would tend to separate the two halves after they have been severed or cut by the blade, the second blade, in this instance, acting as such means.

What I claim as my invention and desire to secure by Letters Patent is:

1. A fruit halving instrument comprising a pair of relatively movable blades having a common cutting edge.

2. A fruit halving instrument comprising two relatively movable blades connected together and having their connected portion forming a common cutting edge.

3. A fruit halving instrument comprising two blades having registering pit-receiving slots and also having a common cutting edge on opposite sides of the slots connecting the blades for relative movement.

4. A fruit halving instrument comprising two blades having registering pit-receiving slots and also having a common cutting edge on opposite sides of the slots connecting the blades for relative movement, the edges of the slots being formed with cutting edges.

5. A fruit halving instrument comprising two blades formed from a single piece of spring sheet material bent between its ends, the material being slotted on opposite sides of the bends and each of said slots registering with the other and intersecting the bend to form pit-receiving slots.

6. A fruit halving instrument comprising two blades formed from a single piece of spring sheet material bent between its ends, the material being slotted on opposite sides of the bends and each of said slots registering with the other and intersecting the bend to form pit-receiving slots, and the material at the bend being formed with cutting edges on opposite sides of the slots.

MABEL A. CLARK.

Copies of this patent may be obtained for five cents each, by addressing the "Commissioner of Patents, Washington, D. C."